TRANSITORY MEMORY CIRCUITS

Filed Nov. 29, 1950 2 Sheets-Sheet 1

INVENTOR
Robert Serrell
BY Morris A. Rabkin
ATTORNEY

TRANSITORY MEMORY CIRCUITS

Filed Nov. 29, 1950 2 Sheets-Sheet 2

INVENTOR
Robert Serrell
BY Morris A. Rabkin
ATTORNEY

Patented May 26, 1953 2,639,859

UNITED STATES PATENT OFFICE 2,639,859

TRANSITORY MEMORY CIRCUITS

Robert Serrell, Princeton, N. J., assignor to Radio Corporation of America, a corporation of Delaware Application November 29, 1950, Serial No. 198,086

8 Claims. (Cl. 235—61)

Figure 1:
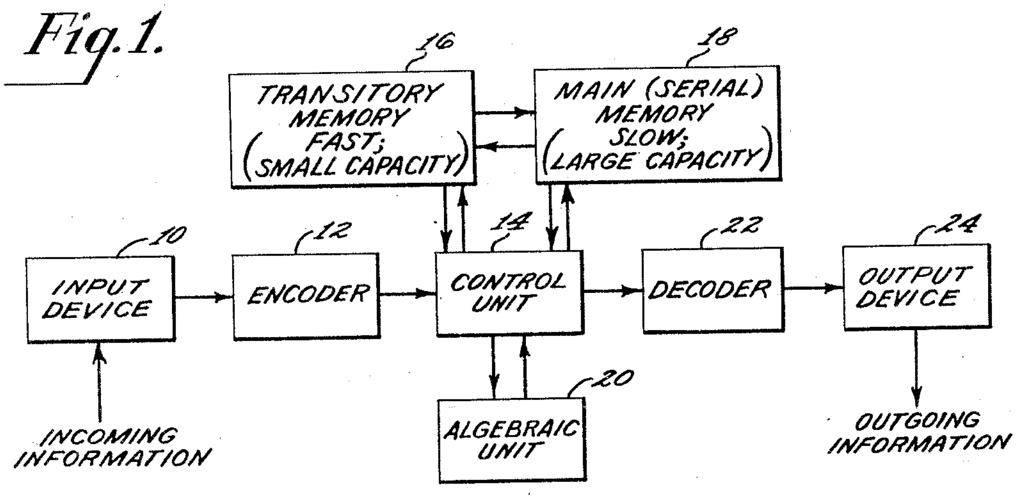

This invention relates to information-handling machines and more particularly is a transitory storage device for double storage information-handling machines.

A double storage information handling machine is a general name for a machine into which a large amount of information is entered to be memorized. Subsequently parts of the information are extracted from the machine to be combined, replaced or mathematically operated upon by new, incoming information. In the operation of the double storage machine two memories or storage devices are used. One of the storage devices possesses large capacity but has a serial access, which implies a long access time, while the other provides a relatively small storage capacity with a short access time. The large capacity long access time storage device may be one or more tapes used either as endless belts or in reels. The recording medium of the tape may be a magnetized coating, or photographic film or electrostatic charges in a dielectric.

The small storage capacity, short access time memory or transitory storage device is used to hold information which flows into the machine until its proper address for entry into the large capacity storage device is reached, or until the information it supplants or together with which it is to be combined, is obtained. Outgoing information, as well as partial results pending completion of other operations, may also be stored in transitory storage. Stated simply, a transitory memory stores incoming or outgoing information for the time required to explore the large capacity serial access memory.

It is an object of the present invention to provide a novel transitory memory device.

It is a further object of the present invention to provide a transitory memory device which permits rapid access to the stored information.

It is still a further object of the present invention to provide a transitory memory device which permits rapid, random access to the stored information.

Yet another object of the present invention is the provision of a transitory memory device which is simple and inexpensive.

These and other objects of my present invention are achieved by providing a pair of glow tubes for each binary digit of data and for each binary digit of the accompanying address. The glowing or non-glowing condition of each of a pair of glow tubes is representative of a binary digit of datum or address as the case may be. Means are provided to condition each of a pair of glow tubes in accordance with the digit of address or datum represented thereby. The signals representing the information to be stored and its address are applied to the conditioning means. Each address digit pair of glow tubes has an address gate coupled to these tubes to be biased by them. Querying address signals are applied to the address gates. Coincidence between the stored address in a register and the querying address signals is required to open all the address gates. Each datum digit pair of glow tubes has a pair of triodes which are coupled to the flow tubes to be biased according to their condition. These triodes are all coupled to the last address gate. In response to a pulse applied by the address gate, the triodes all generate pulses representative of the stored information. Means are provided which are responsive to the glow of the glow tubes to prevent new information from being written on top of information already stored. A storage register may be cleared by dropping the voltage applied to the glow tubes below the extinction level.

The novel features of the invention as well as the invention itself, both as to its organization and method of operation, will best be understood from the following description, when read in connection with the accompanying drawing, in which Figure 1 is a block diagram of a double storage type of information-handling machine.

Figure 3:
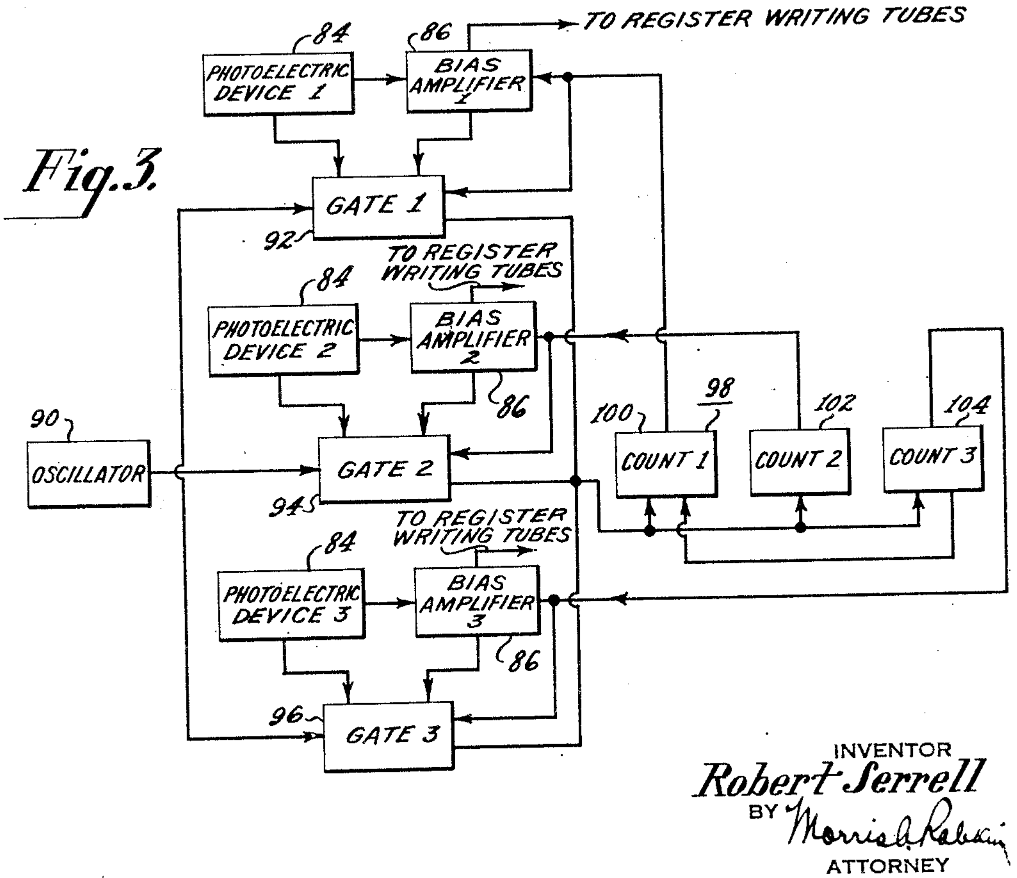
Figure 2:
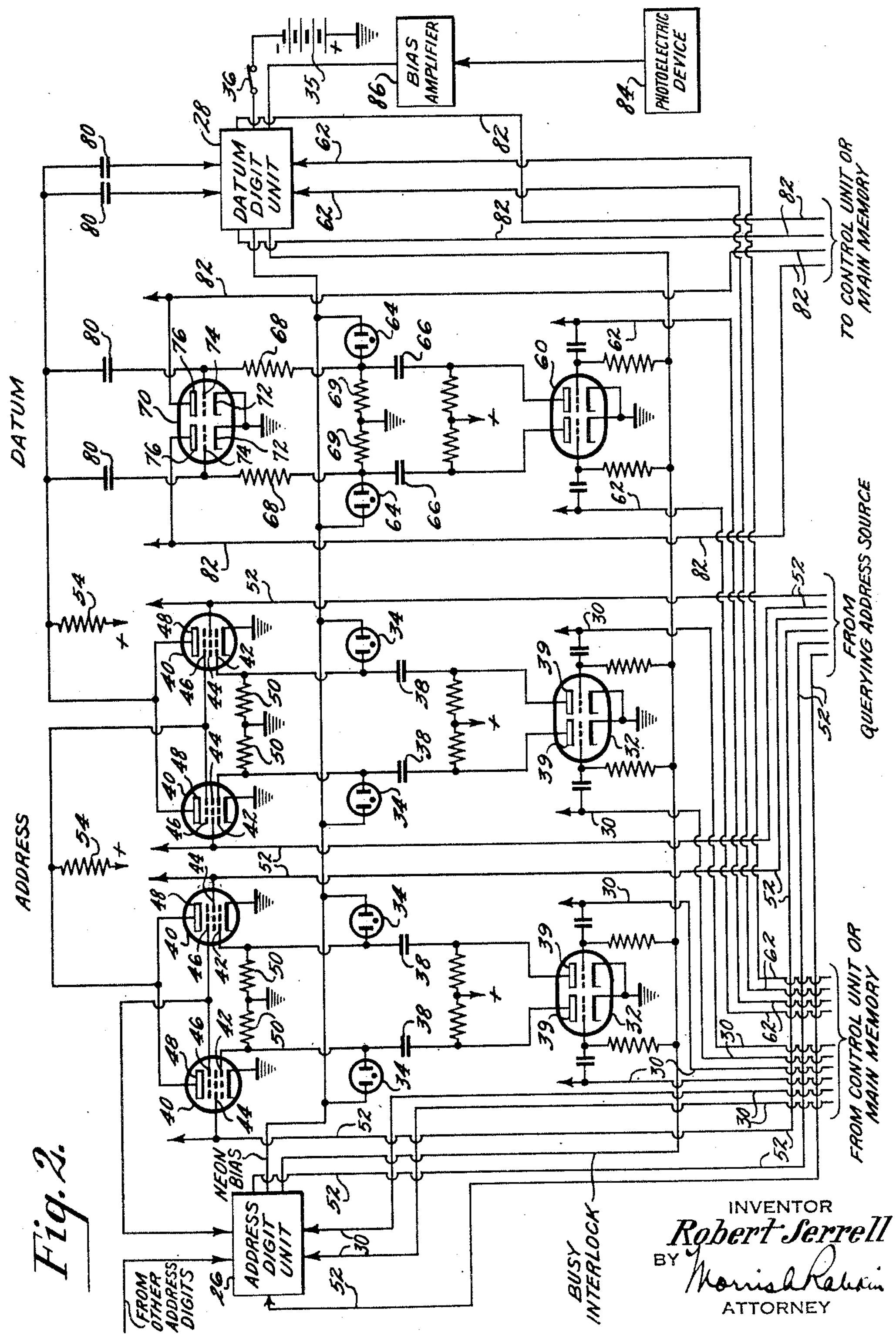

Figure 2 is a partial schematic and partial circuit diagram of an embodiment of this invention, and Figure 3 is a schematic diagram of a transitory memory storage register selection system.

Referring now to Figure 1, there may be seen a block diagram of one type of information-handling machine employing a transitory memory. This is shown by way of example and is not to be construed as the sole machine in which the transitory memory, which is the embodiment of my invention, may be employed. Information to be supplied to the machine is applied to an input device 10, such as a keyboard of some kind, upon which the information is introduced. This information is applied to an encoder 12 which may be an arrangement of relays or vacuum tubes for translating the information into a pulse code which may be utilized by the machine. Such code includes, in addition to a number of items or data, an address for each datum which enables the subsequent identification and selection of the data and also serves to indicate where a datum is to be stored.

The encoder output is applied to a control unit

14. This unit may be a combination of vacuum tube circuits which serve to route the various components of the information to the proper parts of the machine at the proper time. The control unit 14 also allows execution of various programs chosen by the operator of the machine or determined by the information itself. The control unit feeds information into the transitory memory 16 to be stored therein until it can be entered in the main (serial) memory 18 or its counterpart looked up therein. The control unit 14 also receives information from the main and transitory memories for transmittal to an algebraic unit 20 which performs mathematical operations on this information as directed and then returns the results to the control unit either for subsequent storage or to be applied to a decoder 22 which translates outgoing information into a form which can be used by an output device 24. The output device 24 may also be some type of a printing device.

The main memory 18, as previously stated, may consist of a magnetic tape with many parallel channels. All relevant information is stored therein and the memory may serve to provide a permanent record. If the time required to explore successively all the information on a tape loop is T seconds, the average access time to this information is $$\frac{T}{2}$$

seconds (since the information is randomly distributed along the tape). Assuming that information flows in or out of the machine at the rate of R arbitrary units per second, a transitory memory capacity of $$\frac{RT}{2}$$

units of information is required to hold information which is on its way to or from permanent storage until it can be stored or utilized.

A number of transitory memory registers 16 are provided to hold information in transit line by line. Each line contains, together with the information itself, or datum, an identifying address. Each individual register must be separately clearable and it should not be possible to enter new information into a register until it is cleared. The information contained in any register of the transitory memory is automatically supplied to the utilization circuits at the instant the identifying address involved is called.

In order not to impose undue limitations on the performance of other components the access time of a transitory memory should be short. Small glow tubes of the type that have neon gas have an effective deionization time of 5 to 10 microseconds. Their cost is low. These tubes may be operated as storage elements for a transitory memory since, by connecting a glow tube through a resistor to a D. C. source whose voltage is just below the firing level, a momentary increase of the voltage at the tube terminals causes it to glow (within a few microseconds). The tube will continue to glow after the momentary increase is removed, thus registering the fact that an increase was applied. The glow is extinguishable within a few microseconds by momentarily decreasing the voltage at the glow tube terminals below the sustaining potential value.

Referring now to Figure 2, a portion of one transitory memory register may be seen. However, from the following description, taken together with the drawing, it will readily appear how a complete transitory memory using any desired number of these registers may be built. The circuit shown is for two consecutive digits of the address and one digit of the accompanying datum. Other address digits are added to the left of the circuits as shown by the rectangle 26 representing an address digit unit. Other datum digit units may be added to the right of the circuits in the manner shown for the datum digit unit represented by the rectangle 28.

For each digit of the address, push-pull binary signals corresponding to the encoded address are applied from a control unit or main memory to input leads 30 which are connected to the grids of a duotriode 32 which serves as the address unit writing tube. Two glow tubes 34 are assigned to each address digit. One electrode of each of the glow tubes 34 is connected to a bias source 35 through a switch 36. The other electrode of each glow tube 34 is connected respectively (1) through a capacitor 38 to the anode 39 of the duotriode address writing tube 32, (2) to one of the control grids 42 in one of a pair of multigrid tubes 40, and (3) to ground through a grid resistor 50. The multigrid tubes 40 serves as address gates and each of a pair of leads 52 upon which query address signals are impressed are respectively connected to a second control grid 44 in each of the pair of multigrid tubes 40. The remaining grids 46 in the pair of multigrid tubes are connected together and to the anodes 48 of an immediately preceding pair of multigrid tubes 40. If this were the first address digit unit this anode connection obviously would be omitted. In that event the connected together grids are returned to a suitable source of positive potential. The anodes 48 of each pair of multigrid tubes 40 are connected together and then are connected (1) to B+ through a load resistor 54 and (2) to the connected together grids 46 of the subsequent address digit pair of multigrid tubes 40.

A datum digit place includes a duotriode tube 60 which serves as a writing tube. The datum digit signals are push-pull binary signals which are applied to a pair of leads 62 to be impressed upon the grids of the duotriode tube 60. Each datum digit place also has a pair of neon glow tubes 64 each of which has one electrode (1) coupled through a condenser 66 to one of the anodes of the datum digit writing duotriode tube 60, (2) coupled through a resistor 68 to one of the grids 74 of a duotriode 70, and (3) coupled to ground through another resistor 69. The other electrode of each of the pair of glow lamps 64 is connected to the source of exciting potential 35 through a switch 36. The duotriode 70 serves as a datum digit reading device. The connected together anodes 48 of the multigrid tubes 40 of the last one of the address digit places is connected through condensers 80 to the grids 74 of all the duotriode tubes 70 of all the datum digit places. The anodes 76 of the duotriodes 70 are connected to a pair of output leads 82 which carry the datum digit signal generated to the control unit or main memory.

The signals representing information to be entered into the register are push-pull in nature and are of the binary type. Push-pull signals corresponding to the various columns of the address and of the associated datum are simultaneously impressed upon the respective input leads 30, 62. Dependent upon the nature of the information, the writing tubes 32, 60 will condition the pairs of glow tubes 34, 64 so that one or the other is glowing. All glow tubes that are energized in this manner remain energized after the signals are removed from the input leads 30, 62. All glow tubes that are energized, by virtue of their connections with an associated grid, 42, 74, apply a negative bias to that grid. The glow tubes therefore serve to condition the associated address gates 40 and the datum digit reading tubes 70 in accordance with the information represented thereby.

As previously stated, the information stored in the datum part of each register is to be released, or read, at the instant its address is called. Signals representing the addresses that are successively called are impressed upon the querying address leads 52. If each digit of a particular address corresponds to that which is stored in a particular register of the transitory memory, one multigrid gate tube 40 in each address column of this register will conduct. The other gate tube 40 is kept biased off by the excited glow tube. The fact that all address gates are opened in a particular register is established by propagation of a pulse, the address conicidence instruction, from the plate 48 of one gate to the screen 46 of the next. The last address gate tube transmits this pulse to the grids 74 of the datum digit reading tubes 70 through the condensers 80. The grids 74 of all of these tubes 70 are driven positive so that a datum digit signal is supplied to the output leads 82 by those of the signal generating tubes which are not maintained biased off by the associated glow tubes. Therefore the datum digits are supplied in response to the proper address signals being received.

Since the signal circuits of the grids of the writing tubes in any single column are all coupled to the same information source, a means is required to prevent the storage of new information in the registers that are already in use as well as a means to insure that new information is stored in only one of the available registers and not in all of the available registers. The above is accomplished simply by biasing off the writing tubes 32, 60 whenever a register is in use and also biasing off the writing tubes 32, 60 of all but one available register so that the new information is only written into the one register. One digit of the address entered into a register may be used as a means of identifying a busy register. A preferred system is one in which each register has associated therewith a photoelectric device 84 with a slightly delayed response, which responds to light from glow tubes in the register and causes a bias amplifier 86 to bias off the writing tubes of the register as soon as any one of the glow tubes 34, 64 is glowing. A register may be cleared simply by removing momentarily the excitation for all the neon tubes 34, 64 in a register. This is accomplished by opening the switch 36 in the neon tube biasing circuit. The mechanical switch shown may, of course, be replaced by an electronic switch.

Figure 3 shows, by way of example, an electronic system for entering new information into only one available register instead of all the available registers. The system shown is for three registers but, from the description and drawing, it will be obvious how the system can be extended to control as many registers as are required for the transitory memory. An oscillator 90 provides oscillations at a frequency at which it is desired to transfer between registers. A normally closed gate 92, 94, 96 is provided for each register and the oscillator output is applied to each gate to be passed through the gate when it is opened. The photoelectric device 84 from each register, which controls the associated bias amplifier 86, of the register to bias off the register writing tubes, is connected to its associated gate and applies a bias to the gate. The bias amplifier 86 for each register is also connected to its associated gate to apply a bias. A ring counter 98 is also required which has as many counting stages as there are registers. In the example shown, there are only three stages 100, 102, 104 required. The output of all the gates 92, 94, 96 is applied to the counter 98 to advance its count. Each counting stage 100, 102, 104 has its output connected to apply a bias to one of the bias amplifiers 86 and to the associated gate 92, 94, 96. The ring counter 98 may be one of those well known in the art where only one tube conducts while the others are non-conducting. Application of a pulse to be counted advances the count by rendering the conducting tube non-conductive and the succeeding tube conducting.

In the operation of the system shown in Figure 3, the bias applied from each non-conducting counting stage to its associated bias amplifier controls the bias amplifier, as if it were actuated by the associated photoelectric scan, to bias off the writing tubes of the associated register. The conducting counting stage, however, has no effect on the bias amplifier to which it is connected. Each non-conducting counting stage also maintains closed the gate to which it is connected. The conducting counting stage applies an opening bias to its associated gate. When a photoelectric device is activated by its associated register it applies a bias to the associated gate to open it. Also, each biasing amplifier, when applying a bias to render the writing tubes of the associated register inactive, applies an opening bias to the associated gate. When a photoelectric device and a bias amplifier are not actuated, they each individually apply a closing bias to the associated gate. It may therefore be seen that for a gate to be open to pass a counting pulse to the counter it must receive an opening bias from, (1) an actuated photo-electric device 84, (2) an actuated bias amplifier 86, and (3) a counter stage which is conducting.

Assume that the first counting stage 100 is conducting and that information has just been entered into the first register. In response to the bias from the actuated photo-electric device 1, the bias amplifier 1, and the first counting stage 100, the first gate 92 opens and permits a counting pulse to be applied to the counter 98. Assume that the second and third registers are empty. The counter advances to the second count, and the first gate 92 is closed upon transfer of conduction to the second count stage 102. Since the photoelectric device 2 of the second register is not actuated, the second gate 94 remains closed. The second register will record new information since, when the second counter stage 102 becomes conductive it permits the bias amplifier 2 to remove bias from the second register writing tubes. The first register photoelectric device 1 and bias amplifier 1 maintain the first register writing tubes biased off. The third counting stage 104 and the third register bias amplifier 3 maintain the third register writing tubes biased off. Therefore, new information will only be entered into the available second register.

If the second register already has information stored therein, upon transfer of conduction from the first to the second counter stages, the second gate 94 is opened and the count will then be transferred to the third counting stage 104. There it stops if the third register is available for information storage. The system shown thus scans the registers in turn until it finds one available for the entry therein of new information. It then continues its search for the next available register. If desired, two or more registers may be connected in parallel to permit writing of information therein simultaneously.

As previously indicated, at the instant address-coincidence occurs a reading pulse which actuates the datum digit reading tubes 70 is generated by the address digit columns of the register and causes transmission of the information stored in the datum part of the register. This reading pulse can also be used to "gate" any other devices whose operation is to be synchronized with address-coincidence. In particular it may be used to open tape gate circuits releasing whatever information is stored on tape under the address considered. It can also be delayed to provide a clearing signal for a register after the information contained in the register has been safely transmitted and utilized.

The reason for the use of two glow tubes 34, 64 to represent an address or data digit instead of one is that there are substantial variations in the characteristics of neon tubes and the like which are avoided by the circuit shown. The effect of energization of any one of the neon tubes is to bias off the associated grid. When the neon tube is not energized the grid concerned is at ground potential. When the tube is energized the grid is biased off by a minimum cut-off potential determined essentially by the resistor connecting the neon tube to ground and the value of the power supply. There may be large variations in the bias supplied to the grid allowable as long as these variations do not rise above the cutoff potential of the multi-grid tubes selected.

From the foregoing description it will readily be apparent that an improved, inexpensive and novel transitory memory system has been provided which permits rapid and random access to stored information. Although but a single embodiment of the present invention has been shown and described, it should be apparent that many variations may be utilized in the particular embodiment herein disclosed, and that many other embodiments are possible, all within the spirit and scope of the invention. Therefore, it is desired that the foregoing description shall be taken as illustrative and not as limiting.

What is claimed is:

1. A transitory memory system register comprising a first plurality of pairs of glow tubes, means to condition each of said pairs of glow tubes to be representative of a different digit of an address, a second plurality of pairs of glow tubes, means to condition each of said second plurality of pairs of glow tubes to be representative of a different digit of datum, means to compare signals representative of a querying address with the address represented by said first plurality of pairs of glow tubes, means to apply signals representative of a querying address to said signal comparing means, and means to generate signals representative of the datum represented by each of said second plurality of pairs of glow tubes responsive to an address coincidence output from said signal comparing means.

2. A transitory memory system register comprising means to represent each digit of an address, said address means including a pair of glow tubes for each of said digits, means to represent each digit of datum, said datum means including a pair of glow tubes for each of said digits, means to apply address and datum representative signals to said address and datum means to excite one of said pairs of glow tubes responsive to said signals to be representative of the digits of said address and datum signals, means to apply signals representative of a querying address to said address means, and means to generate signals representative of the datum information represented by said pairs of glow tubes in said datum means upon coincidence of said querying address signals and the address represented by said pairs of glow tubes in said address means.

3. A transitory memory system comprising a plurality of address digit and datum digit registers, each of said registers including a first plurality of pairs of glow tubes, means to condition each of said pairs of glow tubes to be representative of a different digit of an address, a second plurality of pairs of glow tubes, means to condition each of said last-named pairs of glow tubes to be representative of a different digit of datum, means to compare signals representative of a querying address with the address represented by said first plurality of pairs of glow tubes, means to apply signals representative of a querying address to said signal comparing means and means to generate signals representative of the datum represented by said second plurality of pairs of glow tubes responsive to an address coincidence between a querying address signal and the address represented by said first plurality of glow tubes; means responsive to address and datum information stored in a register to prevent storage of new address and datum information in said register, and means to clear information from a register.

4. A register for storing address digits and datum digits comprising address digit storage means and datum digit storage means, each said address digit storage means including at least two electron discharge tubes upon which a signal representative of an address digit is impressed, at least two glow tubes each coupled to one of said two electron discharge tubes to be conditioned responsive to outputs therefrom, address gate means coupled to said glow tubes to be biased in accordance with the condition of said glow tubes, means interconnecting all said address gates, means to keep said gate means closed until all said gate means are opened simultaneously, means to impress querying address signals on all said address gate means; each said datum digit storage means including at least two electron discharge tubes upon which a signal representative of a datum digit is impressed, at least two glow tubes each coupled to one of said two electron discharge tubes to be conditioned responsive to outputs therefrom, datum digit signal reading means coupled to said glow tubes to be conditioned in accordance with the condition of said glow tubes, and means coupling all of said datum digit signal reading means to one of said address gates to cause reading of datum digit signals responsive to all said address gate means being opened.

5. A register as recited in claim 4 wherein each of said address gate means comprises a pair of multigrid tubes each having an anode, a cathode and three control grids, one of said control grids in each of said tubes being coupled to a different one of said two glow tubes associated with said gate to have a bias applied in accordance with the condition of said glow tubes, another of the control grids in each of said tubes being coupled to said means to impress querying address signals, the last of the control grids in each of said tubes being connected together and coupled to the anodes of the multigrid tubes in the preceding address gate means, the anodes of said multigrid tubes being coupled to one of the control grids in each of the multigrid tubes in the succeeding address gate means, the anodes of the multigrid tubes of the last of said address gate means being coupled to all said datum digit signal reading means.

6. A register as recited in claim 4 wherein each of said datum digit signal reading means comprises a pair of tubes each having an anode, cathode and control grid, each of said control grids being coupled to a different one of said two glow tubes associated with said datum digit storing means to have a bias applied in accordance with the condition of said two associated glow tubes, said control grids also being coupled to one of said address gates, the anodes of each of said pair of tubes being connected to an output terminal.

7. A register as recited in claim 4 where there is included in addition a photoelectric means responsive to a glowing condition of the glow tubes in said register to prevent the entry of new information upon the information already in said register.

8. A register for storing address digits and datum digits, comprising a plurality of address digit storage means and a plurality of datum digit storage means, each said address digit storage means including a first and second triode tube including anode, cathode and grid electrodes, a first and second glow tube each having a pair of electrodes, a first and second multigrid tube each having an anode, cathode and three control grids, means to apply push-pull address signals to the grids of said first and second triodes, one of the electrodes in said first glow tubes being coupled to said first triode tube anode and to one of said first multigrid tube control grids, one of the electrodes in said second glow tube being coupled to said second triode tube anode and to one of said second multigrid tube control electrodes, means to apply glow tube exciting potential coupled to the other electrode of said first and second glow tubes, another one of the control grids in said first multigrid tube being connected to another one of the control grids in said second multigrid tubes, said connected together control grids being connected to the anodes of multigrid tubes of a preceding address digit storage, the anodes in said first and second multigrid tubes being coupled together and coupled to the connected together control grids of the first and second multigrid tubes of a succeeding address digit storage means, and means to impress push-pull querying address signals upon the remaining control grids in said first and second multigrid tube; each said datum digit means comprising a first and a second writing tube each having anode, cathode and grid electrodes, a first and second datum glow tube each having a pair of electrodes and a first and second datum digit signal generating tube each having anode, cathode and grid electrodes, means to apply push-pull datum digit signals coupled to said first and second writing tube grids, one electrode in said first datum glow tube being coupled to said first writing tube anode and said first datum digit signal generating tube grid, one electrode in said second datum glow tube being coupled to said second writing tube anode and said second datum digit signal generating tube control grid, the other electrode of said first and second datum glow tubes being coupled to said glow tube potential applying means, and output terminals to which the anodes of said first and second datum digit reading tubes are coupled, said grids of all of said first and second datum digit reading tubes being coupled to the coupled together anodes of the first and second multigrid tubes of a last one of said address digit means to be responsive to an output therefrom.

ROBERT SERRELL.

References Cited in the file of this patent

UNITED STATES PATENTS

| Number | Name | Date |
|---|---|---|
| 2,528,394 | Sharpless et al. | Oct. 31, 1950 |
| 2,594,960 | May | Apr. 29, 1952 |